(12) United States Patent  (10) Patent No.: US 8,417,720 B2
Sukanen et al.  (45) Date of Patent: Apr. 9, 2013

(54) METHOD AND APPARATUS FOR ACCESSING CONTENT BASED ON USER GEOLOCATION

(75) Inventors: Jari Pekka Sukanen, Espoo (FI); Marko Eemeli Takanen, Espoo (FI); Toni Laurila, Helsinki (FI)

(73) Assignee: Nokia Corporation, Espoo (FI)

( * ) Notice: Subject to any disclaimer, the term of this patent is extended or adjusted under 35 U.S.C. 154(b) by 557 days.

(21) Appl. No.: 12/627,298

(22) Filed: Nov. 30, 2009

(65) Prior Publication Data

US 2010/0235381 A1  Sep. 16, 2010

Related U.S. Application Data

(63) Continuation-in-part of application No. 12/401,125, filed on Mar. 10, 2009, now abandoned.

(51) Int. Cl.
*G06F 17/30* (2006.01)
(52) U.S. Cl.
USPC .......................................... 707/769; 707/782
(58) Field of Classification Search .................. 707/769, 707/782
See application file for complete search history.

(56) References Cited

U.S. PATENT DOCUMENTS

| | | | |
|---|---|---|---|
| 6,647,257 B2 | 11/2003 | Owensby | |
| 6,650,902 B1 | 11/2003 | Richton | |
| 7,274,941 B2 | 9/2007 | Cole et al. | |
| 7,412,247 B2 | 8/2008 | Hughes | |
| 7,461,528 B2 | 12/2008 | Taniguchi et al. | |
| 7,565,153 B2 | 7/2009 | Alcock et al. | |
| 2002/0051540 A1 | 5/2002 | Glick et al. | |
| 2002/0154157 A1* | 10/2002 | Sherr et al. | 345/716 |

(Continued)

FOREIGN PATENT DOCUMENTS

| | | |
|---|---|---|
| WO | WO 00/22495 | 4/2000 |
| WO | WO 00/49530 | 8/2000 |
| WO | WO 02/089442 A1 | 11/2002 |
| WO | WO 2004/054295 A1 | 6/2004 |

OTHER PUBLICATIONS

International Search Report and Written Opinion for corresponding International App. No. PCT/FI2010/050166 dated May 25, 2010, pp. 1-16.

(Continued)

*Primary Examiner* — John E Breene
*Assistant Examiner* — Dennis Myint
(74) *Attorney, Agent, or Firm* — Ditthavong Mori & Steiner, P.C.

(57) ABSTRACT

An approach is provided for mapping content, such as audio files, to associated metadata about the content. The approach includes initiating a search for local metadata associated with particular content. It is determined whether the local metadata is insufficient. A request for metadata associated with the particular content is generated, if the local metadata is insufficient. The request is sent to a metadata service to obtain result data including metadata for the particular content. A search of the result data from the metadata service is initiated based on a description of the particular content to obtain most relevant metadata of the result data.

17 Claims, 13 Drawing Sheets

U.S. PATENT DOCUMENTS

| | | | |
|---|---|---|---|
| 2003/0003909 A1 | 1/2003 | Keronen et al. | |
| 2003/0051540 A1 | 3/2003 | Morinaga et al. | |
| 2004/0083307 A1 | 4/2004 | Uysal | |
| 2005/0125419 A1* | 6/2005 | Mizutani et al. | 707/10 |
| 2006/0059096 A1 | 3/2006 | Dublish et al. | |
| 2007/0192289 A1* | 8/2007 | Lin et al. | 707/3 |
| 2008/0183591 A1 | 7/2008 | Olsson et al. | |
| 2009/0176510 A1 | 7/2009 | Routtenberg | |
| 2009/0282432 A1* | 11/2009 | Hahnefeld et al. | 725/31 |
| 2010/0146077 A1* | 6/2010 | Davies et al. | 709/219 |

OTHER PUBLICATIONS

Delivery System for Location Based Information in Wireless IP Networks. Lappeenranta, Published: May 10, 2002, pp. 1-35, https://oa.doria.fi/bitstream/handle/10024/35459/nbnfi-fe20021267.pdf?sequence=1.

Supplemental European Search Report for EP 10 75 0419 dated Aug. 7, 2012, pp. 1-7.

* cited by examiner

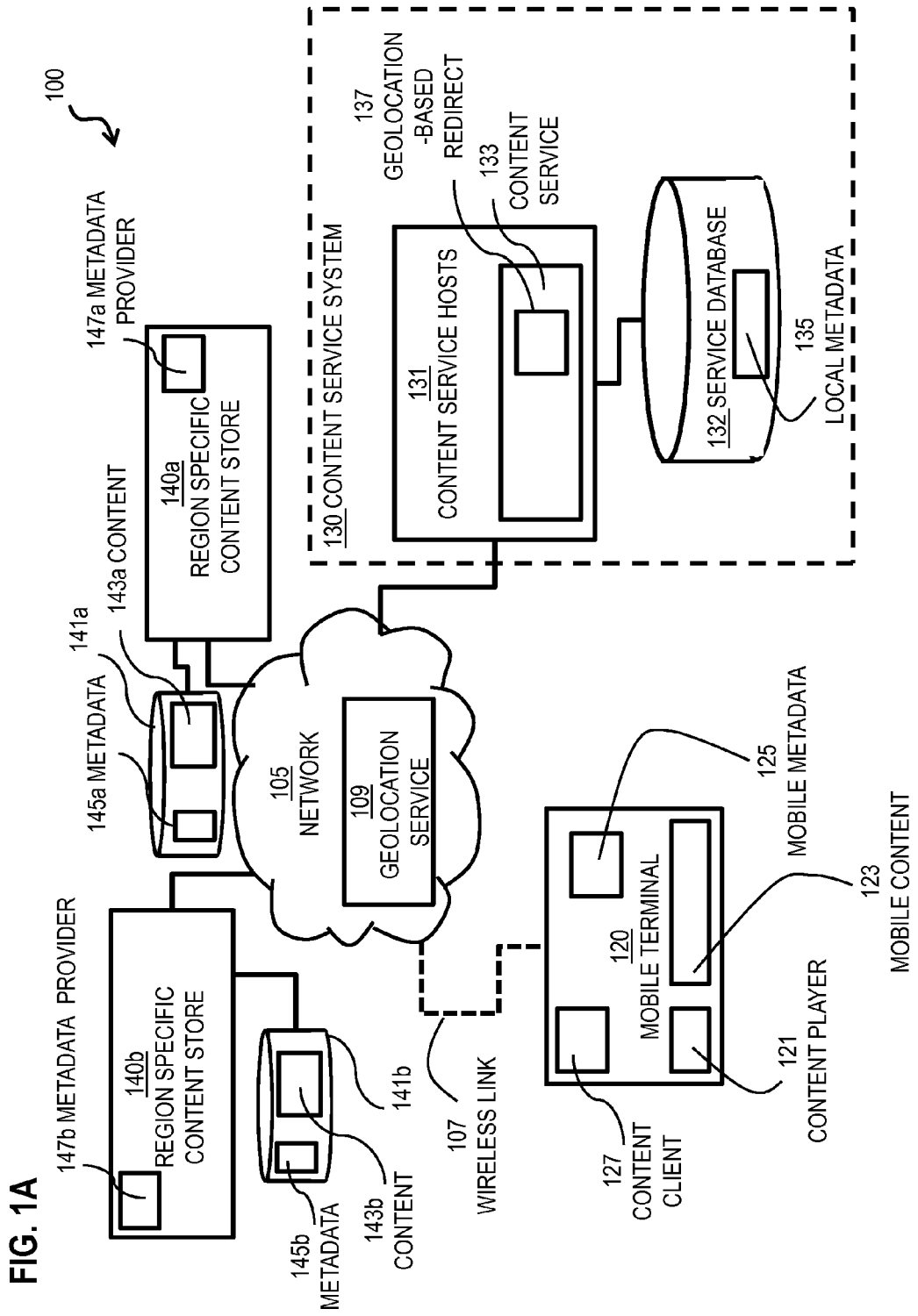

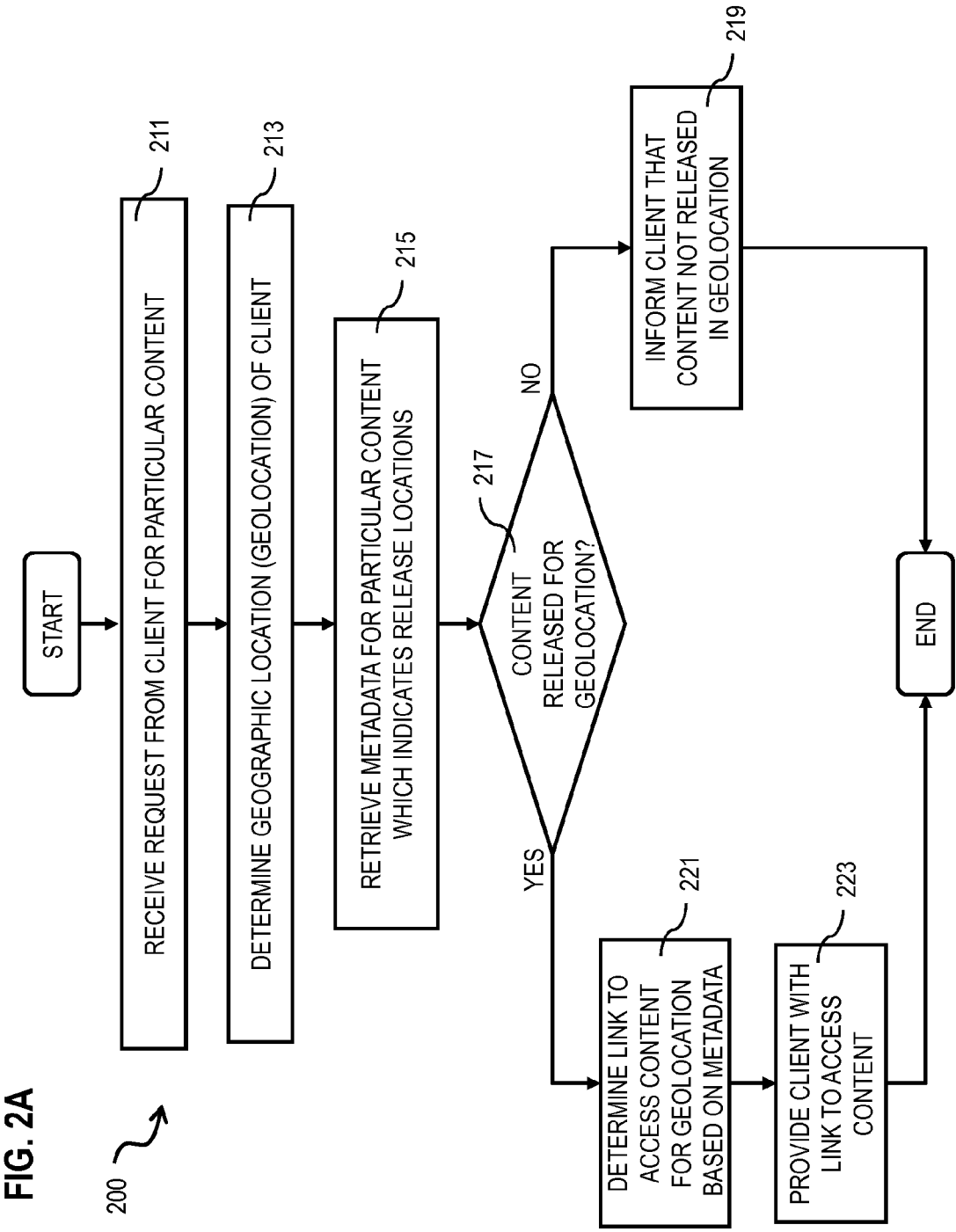

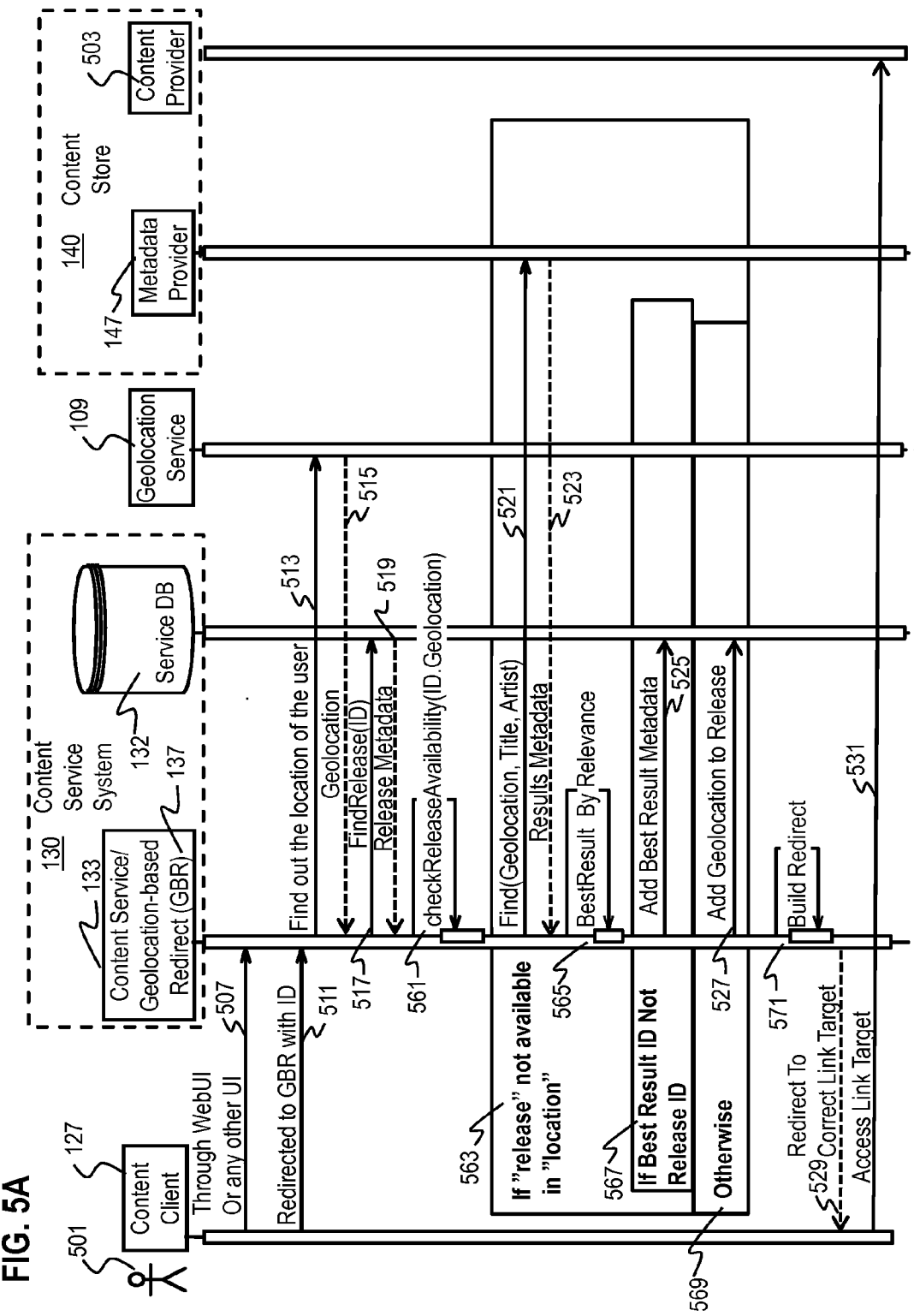

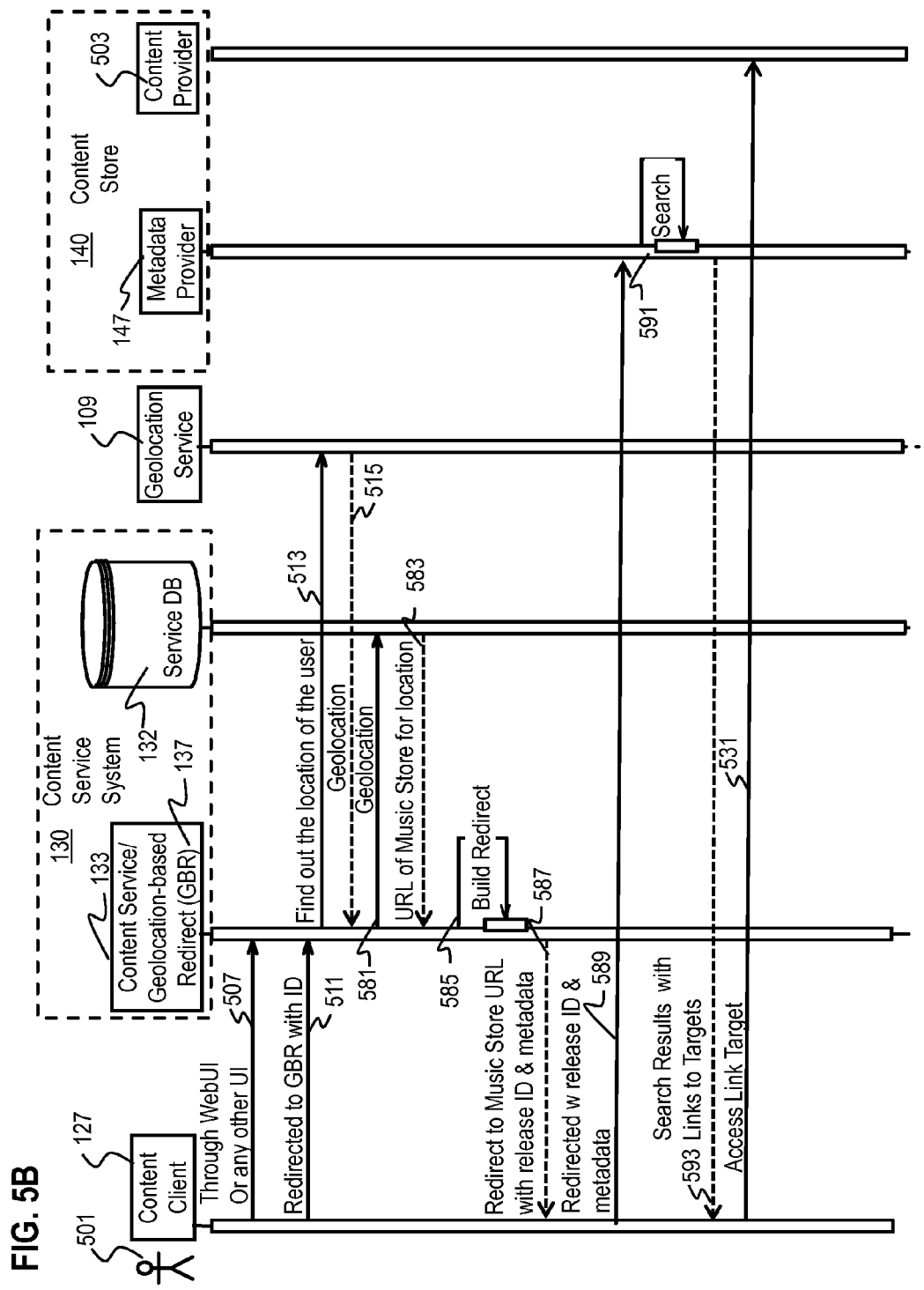

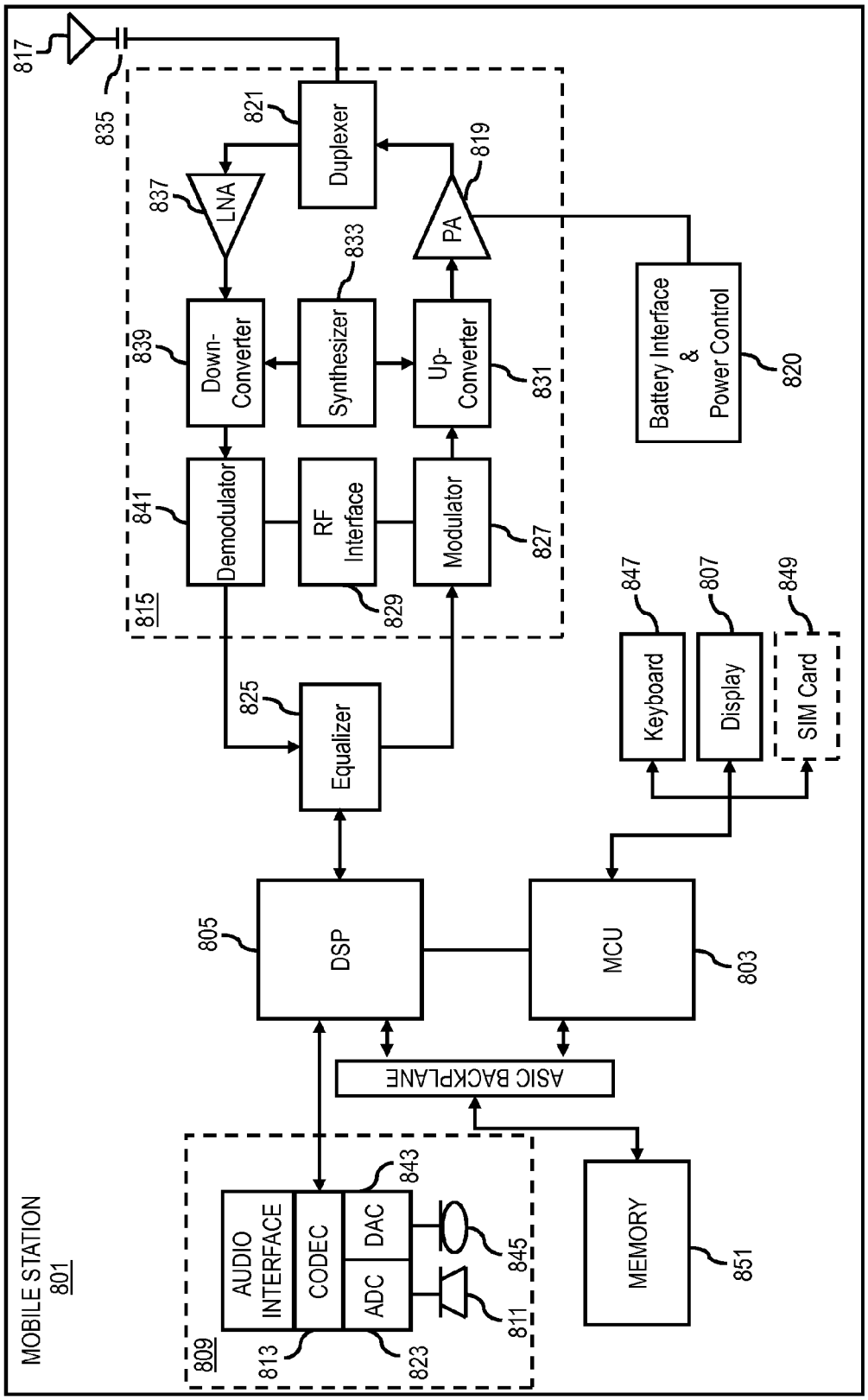

METHOD AND APPARATUS FOR ACCESSING CONTENT BASED ON USER GEOLOCATION

CROSS-REFERENCE TO RELATED APPLICATIONS

This application claims benefit as a Continuation-in-part of application Ser. No. 12/401,125, filed Mar. 10, 2009 the entire contents of which are hereby incorporated by reference as if fully set forth herein, under 35 U.S.C. §120.

BACKGROUND

Media playing applications have been one of the most widely used and popular applications over the Internet. For example, one popular area involves browsing, downloading and playing audio files. A number of service providers maintain media pages on the Internet, where users can browse available media files and select one or more for purchase and download. Users often select media based on references to content on the playlists of their friends and role models. However, many media distributors do not release their content simultaneously worldwide, for a variety of reasons, including phased release to excite user demand, intellectual property issues that vary from country to country, and the degree to which competing products are present in various markets. It can be a challenge for service providers to provide media pages that function in concert with media distributors' geographically restricted releases of content, especially when requests for content reference the playlists of persons in a different country or region. Service providers with a limited regional scope often assume that content release is constant for their region. However, as the service provider develops a global presence, geographical restrictions on released content come into force. The legacy media service systems deployed by those providers may not be able to enforce such geographical constraints on the release of content.

SOME EXAMPLE EMBODIMENTS

Therefore, there is a need, when responding to requests for content by a user, to direct the user to the content suitable for release at the user's geographic location.

According to one embodiment, a computer-readable storage medium carries one or more instructions which, when executed by one or more processors, cause an apparatus to at least perform the steps of receiving a request, corresponding to a user, for particular content; and, determining a geographic location of the user. The apparatus is caused to perform steps further comprising initiating selective redirection for retrieval of the particular content based on the determined geographic location.

According to another embodiment, an apparatus comprises at least one processor and at least one memory including computer program code. The at least one memory and the computer program code are configured to, with the at least one processor, cause the apparatus to perform at least the receiving a request, corresponding to a user, for particular content; and, determining a geographic location of the user. The at least one memory and the computer program code are further configured to, with the at least one processor, cause the apparatus to initiate selective redirection for retrieval of the particular content based on the determined geographic location.

According to another embodiment, a method comprises receiving a request, corresponding to a user, for particular content; and, determining a geographic location of the user. The method also initiates selective redirection for retrieval of the particular content based on the determined geographic location.

According to another embodiment, an apparatus comprises means for receiving a request, corresponding to a user, for particular content; and, means for determining a geographic location of the user. The apparatus includes means for initiating selective redirection for retrieval of the particular content based on the determined geographic location.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 1A is a diagram of a system for accessing content based on user geolocation, according to one embodiment;

FIG. 2A is a flowchart of a process for accessing content based on user geolocation, according to one embodiment;

FIG. 5A is a time sequence diagram that illustrates a sequence of messages and processes for accessing content based on user geolocation, according to one embodiment;

FIG. 5B is a time sequence diagram that illustrates a sequence of messages and processes for accessing content based on user geolocation, according to another embodiment;

FIG. 8 is a diagram of a terminal that can be used to implement an embodiment of the invention.

DETAILED DESCRIPTION OF EXAMPLE EMBODIMENTS

Figure 1B:
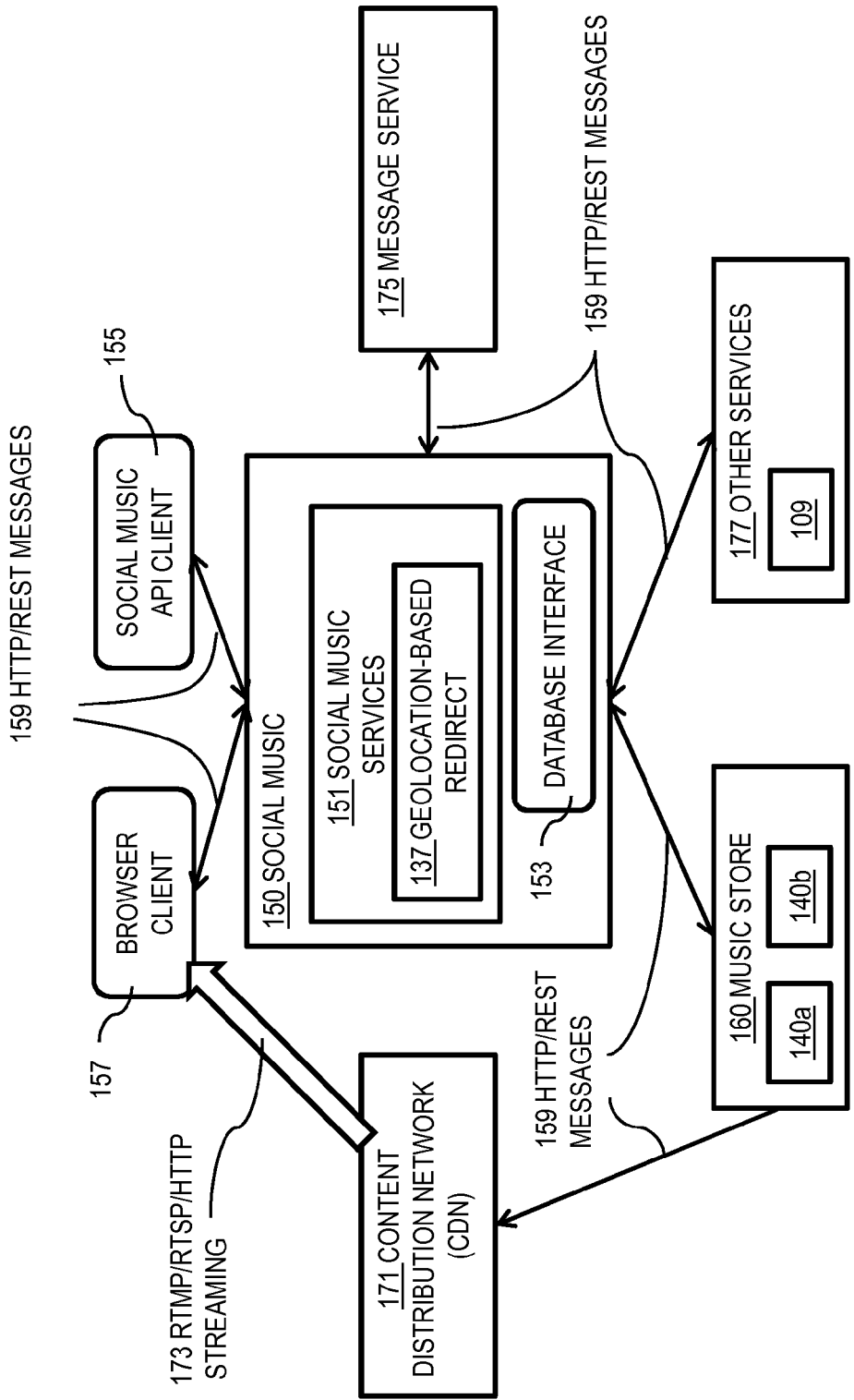
FIG. 1B is a diagram of components of a content service module, according to one embodiment.

A method, apparatus, and software for accessing content based on user geolocation are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although several embodiments of the invention are discussed with respect to accessing music metadata, it is recognized by one of ordinary skill in the art that the embodiments of the inventions have applicability to any type of content playback (e.g., video and games) involving any device (e.g., wired and wireless local device or both local and remote wired or wireless devices) capable of playing content, or capable of communication with such a device. As used herein, content or media includes digital sound, digital images, digital games, and digital videos (such as music videos, news clips and theatrical videos) and any other digital media.

FIG. 1A is a diagram of a system 100 for accessing content, according to an example embodiment. As shown in FIG. 1A, a system 100 includes a content service system 130 and a plurality of nodes (e.g., nodes 120, 131, 140a, 140b) having connection with each other through a communication network 105. This system 100 supports efficient content sharing, particularly in the handling of different content releases in different geographical locations (also referred to as "geolocation").

By way of example, under certain instances, record labels (e.g., a record label is a particular kind of music distributor) release albums and singles so that the content of an album (e.g., bonus tracks, etc.), album arts, or other properties, or some combination, are different in different territories (also called "regions" or "locations" herein) or countries. Also, the content can be released by a local counterpart of a global label or is released during a different year or part of the year. Availability of the different releases in the different countries/regions is often restricted by business contracts between retail sellers and the record labels. Thus, music content providers on the Internet (as implemented in a form of "music stores") may not be allowed to sell all releases in all countries. Because of separate releases for different countries, it might also be the case that what appears to be the same album is available in different countries; however, the actual content released is different in the different countries. To account for different releases of the same named content, the different releases are given different database identifiers, e.g., in a unified backend database. For an external music service system trying to link to a music store to purchase or download content, the different identifiers for different releases of the same named content is problematic. It inhibits offering, to users, links to a store in the user's own country if the links were originally created in reference to another country/region's store, where the identifier is different.

According to certain embodiments, accessing content from a legacy content service system is performed by redirecting a user to a geolocation-sensitive process called a geolocation-based redirect (GBR) process. The GBR process determines a user's geolocation and provides the user with links to a release of the content, which is available in the user's geolocation. This arrangement, in certain embodiments, provides a number of advantages. For example, the existing content clients and content stores can continue to operate as they have in the past without re-engineering. Legacy content service modules are modified only slightly to redirect requests for content to the separate GBR process, and do not have to be re-engineered throughout. The geolocation sensitive data processing is confined to the GBR process. The GBR can be as sophisticated as current and future geographic release restrictions to properly redirect a user to the correct online music store, if one exists.

Nodes 120, 131, 140a, 140b of FIG. 1 can be any type of fixed terminal, mobile terminal, or portable terminal including desktop computers, laptop computers, handsets, stations, units, devices, multimedia tablets, Internet nodes, communicators, Personal Digital Assistants (PDAs), a rack (called a blade) in a cabinet of multiple blades, or any combination thereof. Moreover, the nodes may have a hard-wired energy source (e.g., a plug-in power adapter), a limited energy source (e.g., a battery), or both. It is further contemplated that the nodes 120, 131, 140a, 140b can support any type of interface to the user (such as "wearable" circuitry, etc.). In the illustrated embodiment, node 120 is a wireless mobile terminal (also called a mobile station and described in more detail below with reference to FIG. 8). The mobile terminal 120 is connected to network 105 by a wireless link 107.

By way of example, the communication network 105 of system 100 can include one or more networks such as a data network (not shown), a wireless network (not shown), a telephony network (not shown), or any combination thereof, each comprised of zero or more nodes. It is contemplated that the data network may be any local area network (LAN), metropolitan area network (MAN), wide area network (WAN), the Internet, or any other suitable packet-switched network, such as a commercially owned, proprietary packet-switched network, e.g., a proprietary cable or fiber-optic network. In addition, the wireless network may be, for example, a cellular network and may employ various technologies including code division multiple access (CDMA), enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, wireless fidelity (WiFi), satellite, and the like. In various embodiments, communication network 105, or portions thereof, can support communication using any protocol, for example, the Internet Protocol (IP).

Information is exchanged between network nodes of system 100 according to one or more of many protocols (including, e.g., known and standardized protocols). In this context, a protocol includes a set of rules defining how the nodes interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model. The OSI Reference Model is generally described in more detail in Section 1.1 of the reference book entitled "Interconnections Second Edition," by Radia Perlman, published September 1999.

The mobile terminal 120 includes a data structure with mobile content 123, and a content player process 121 and content client process 127. The content player process 121 is operative to play content from the mobile content data structure 123 in response to input by a user (not shown). According to the illustrated embodiment, the mobile terminal includes content client process 127 that communicates with the content service system 130 over the network 105. The operation of content client process 127 is described in greater detail below with reference to FIG. 4.

The content service system 130 includes one or more content service hosts 131 and a service database 132. The content service hosts are connected directly or indirectly to network 105. The service database 132 resides on one or more nodes connected directly or indirectly to the content service hosts 131, and it is anticipated that, in some embodiments, service database 132 resides on one or more nodes in network 105. The service database 132 includes one or more processes (not shown) and one or more data structures, including one or more local metadata data structures 135 that stores information about content available through the content service system 130.

The content service hosts 131 are one or more network nodes that support the content service module 133. The content service module 133 is a process that supports users in finding, obtaining and playing content on their devices in communication with the network 105. In the illustrated embodiment, the content service module 133 includes a geolocation-based redirect (GBR) process 137, the operation of which is described in greater detail below with reference to FIG. 2A, FIG. 2B and FIG. 2C. A geolocation service 109 is available at one or more nodes in network 105.

According to one embodiment, it is understood herein that local metadata in local metadata data structures 135 is local in the sense that they are controlled by content service module 133, and that the content service module 133 has permission to write to and otherwise edit the data in these data structures. As stated above, the actual data may reside on one or more nodes different from the host of the content service 133, and in communication with the content service 133 directly, as depicted, or via network 105.

The system 100 includes multiple region-specific content stores 140*a* and 140*b* (collectively referenced hereinafter as content stores 140). Each content store is a set of one or more processes that enable a user to purchase and download content. The content stores are connected directly or indirectly to network 105. Each content store is in communication with a different content database: content store 140*a* is in communication with content database 141*a*: and content store 140*b* is in communication with content database 141*b*. The content databases are collectively referenced as content database 141. Each content database 141 resides on one or more nodes connected directly or indirectly to the content store 140, and it is anticipated that, in some embodiments, content database 141 resides on one or more nodes in network 105. The content databases 141 include one or more processes (not shown) and one or more data structures. Content database 141*a* includes one or more content data structures 143*a* and one or more metadata data structures 145*a* that store information about content in content data structures 143*a*. Similarly, content database 141*b* includes one or more content data structures 143*b* and one or more metadata data structures 145*b* that store information about content in content data structures 143*b*. The content data structures 143*a* and 143*b* are collectively referenced hereinafter as remote content data structures 143. The metadata data structures 145*a* and 145*b* are collectively referenced as remote metadata data structures 145. In some embodiments, one or more of the content stores 140 are included in the content service system 130.

The content store processes 140*a*, 140*b* include metadata provider processes 147*a*, 147*b*, respectively, collectively called metadata provider processes 147. The metadata provider processes 147 are adapted to provide metadata from the remote metadata data structure 145 in response to a request for metadata associated with particular content in the content data structures 143. The regional NOKIA™ Music Stores (NMSs) are examples of content stores 140 that reside on one or more hosts connected to a communications network, with at least some different content for different regions.

In many networks, communications between nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

The client-server model of computer process interaction is widely known and used. According to the client-server model, a client process sends a message including a request to a server process, and the server process responds by providing a service. The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others.

Although a particular set of nodes, processes, and data structures are shown in FIG. 1A for purposes of illustration, in various other embodiments more or fewer nodes, processes and data structures are involved. Furthermore, although processes and data structures are depicted, in FIG. 1A and following drawings, as particular blocks in a particular arrangement on particular nodes for purposes of illustration, in other embodiments each process or data structure, or portions thereof, may be separated or combined or arranged in some other fashion on one or more nodes. For example, in one embodiment, GBR process 137 is a separate parallel process from content service process 133; and in one embodiment, metadata provider 147 is a separate process from content store process 140. In an embodiment, content client 127 is incorporated in content player process 121.

FIG. 1B is a diagram of components of a content service module of the content service system 130, according to an example embodiment. FIG. 1B also shows interaction between the content service module (e.g., content service process 133) and other processes on a network.

In the illustrated embodiment, the content service module is called Social Music module 150 and supports users in finding, obtaining and playing music on their local devices in communication with the network. The Social Music module 150 includes Social Music services 151 and a database interface process 153. The Social Music services are a set of applications (e.g., a JAVA™ stack written in the JAVA™ programming language that can be installed and executed on any device that includes a JAVA™ virtual machine (JVM) process). The Social Music services include processor instructions for finding metadata about songs and using the metadata to direct users to resources on the network where the user can purchase or download those songs, or both. The database interface process 153 is the interface between the Social Music module 150 and the local service database 132; and is used to retrieve and store local metadata 135.

In the illustrated embodiment, the Social Music services 151 include GBR process 137 to obtain geolocation sensitive metadata for geographically dependent content and to use the database interface process 153 to store and retrieve the local metadata in the local metadata data structures 135.

The Social Music module 150 interacts with other processes on the network (e.g., network 105) using the hypertext transfer protocol (HTTP), often in concert with the Representational State Transfer (REST) constraints and indicated as arrows 159. The other processes may be on the same node or on different nodes.

In the illustrated embodiment, a user's device (e.g., mobile terminal 120) includes a Social Music application program interface (API) client 155 (a music-oriented embodiment of content client 127) to interact with the Social Music module 150, and a browser client 157 to interact with World Wide Web pages using HTTP. In some embodiments, the social music API client 155 is installed in the browser client 157. The Social Music module 150 interacts with one or more Music Store systems 160, such as the NOKIA™ Music Store or content stores 140a, 140b depicted in FIG. 1A, to purchase songs to be downloaded to a user's device. The download is often accomplished using a Content Distribution Network (CDN) 170. The music store authorizes the CDN 170 to download requested content to the user; and then directs a link on the user's browser client 157 to request the content from the CDN 170. The requested content is delivered to the user through the user's browser client 157 as data formatted, for example, according to HTTP or the real-time messaging protocol (RTMP) or the real-time streaming protocol (RTSP), all well known in the art, and depicted as open arrow 173. As a result, the content is stored on the user's device (e.g., as mobile content 123 on mobile terminal 120). The mobile content 123 arrives on the mobile terminal 120 either directly from the CDN 170, or indirectly through some other device, e.g., a wired node (not shown) using a temporary connection (not shown) between mobile terminal 120 and the wired node.

In some embodiments, the Social Music module 150 uses a message service 175 (such as the MICROSOFT™ YUKON™ service), to receive event data about playback events on the user's device. In some embodiments, the Social Music module 150 uses other services 177 available on the network (e.g., network 105) such as people services to connect with other persons in a Social Music group of persons, map services to determine a user's geolocation (e.g., geolocation service 109) or to show a user's location and points of interest on a map, and game services to determine the user's status in one or more games.

Figure 1C:
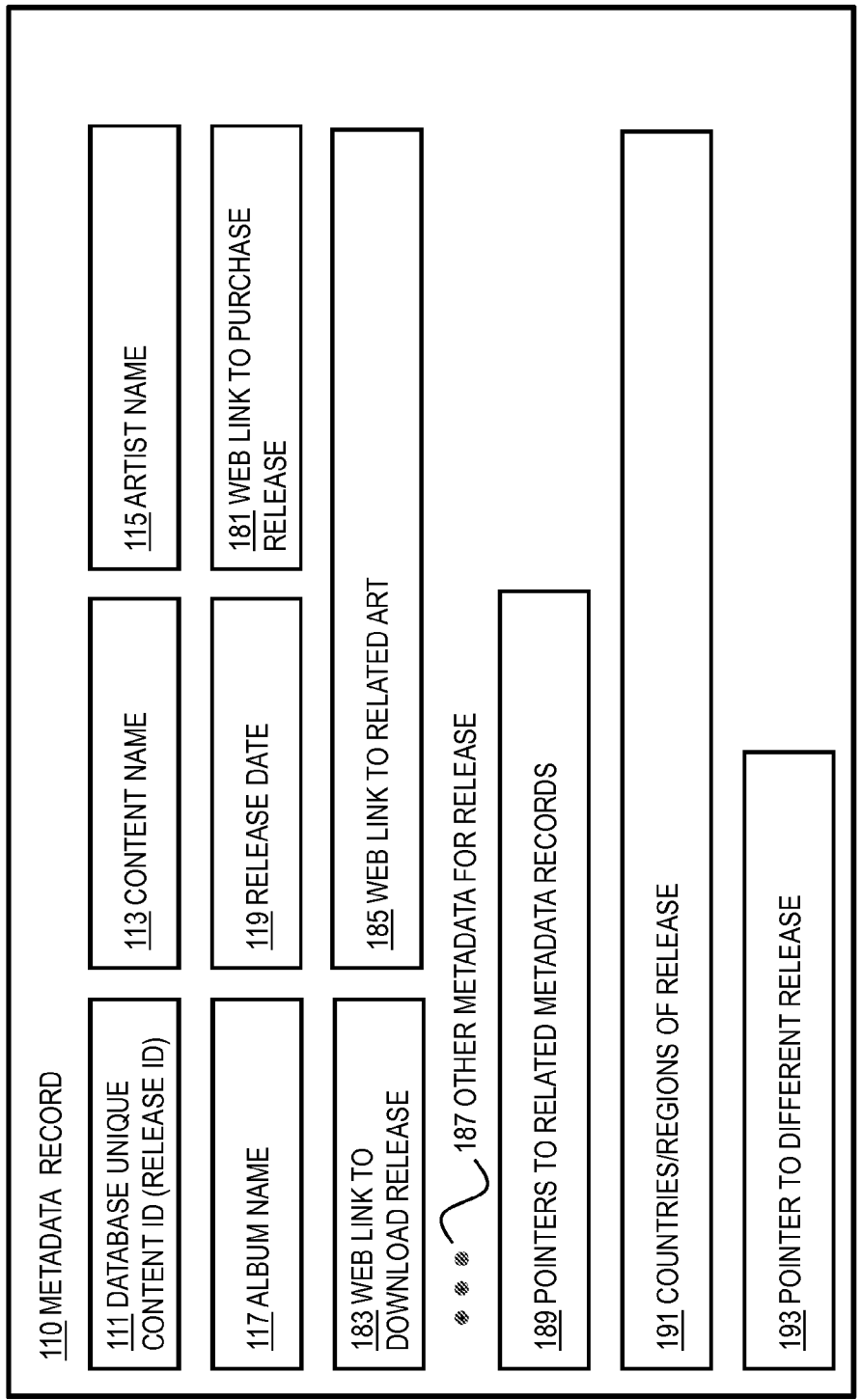
FIG. 1C is a diagram of a metadata data structure, according to one embodiment.

FIG. 1C is a diagram of a metadata data structure, according to one embodiment. In practice, metadata comprises a set of values for a corresponding set of metadata parameters of interest for describing content. In the illustrated embodiment, the metadata data structures 135 and 145 include one metadata record for each unit of content of multiple units of content in the content data structures 143. FIG. 1C depicts an example metadata record 110, which includes a set of fields to hold data indicating values for a corresponding set of metadata parameters. The values for the metadata parameters can be represented in any manner known in the art. For example, in some embodiments, each field holds only a value, and a corresponding metadata parameter is implied by the position of the field in the record. In such embodiments, unknown values are represented by null-values at the position of the corresponding parameter. In some embodiments, the fields are attribute, value pairs (AVPs) or attribute, length, value triplets, well known in the art, so that only pairs or triplets with known values are included in the record. An advantage of AVPs and triplets is that new metadata parameters can be defined and added to records at any time that values are obtained for them.

For purposes of illustration, it is assumed in FIG. 1C that metadata record 110 includes values for metadata parameters that include: a database unique content identifier (ID) in field 111 also called a release ID or product release ID herein; a content name in field 113; an artist name in field 115; an album name in field 117; a release date in field 119; a link to a World Wide Web page (also referred to as a Web link) where the released content can be purchased in field 181; a Web link where the released content can be downloaded in field 183; a Web link where the art related to the released content can be viewed in field 185; an ellipsis 187 indicating other metadata parameter fields; and pointers to related metadata records (e.g., to other songs on the same album or other songs by the same artist or other artists that performed the same song etc.) in field 189. Techniques to list multiple values in a field are well known in the art, such as linked lists, in which the value in the field points to a location in memory or storage where the list begins and each entry has a pointer to a previous or subsequent entry in the list. For convenience, the database unique content identifier (ID) in field 113 is also called by the shorthand term "release ID." The release ID is a primary key into the content data at one of the remote content stores; and is also used to retrieve local metadata more efficiently than an alphanumeric search on content name in field 113 AND artist name in field 115.

To accommodate country/region-specific content releases, the illustrated embodiment includes a metadata parameter for a list of countries/regions where the particular released content is legally available in field 191; and a pointer to a different release of the same content (e.g., released in a different country/region) in field 193. It is assumed, for purposes of illustration, that legacy content service systems do not include fields 191 and 193.

Although fields are depicted in FIG. 1C as particular blocks in a particular arrangement on a single node for purposes of illustration, in other embodiments each field or data structure, or portions thereof, may be separated or combined or arranged in some other fashion on one or more nodes.

Figure 2B:
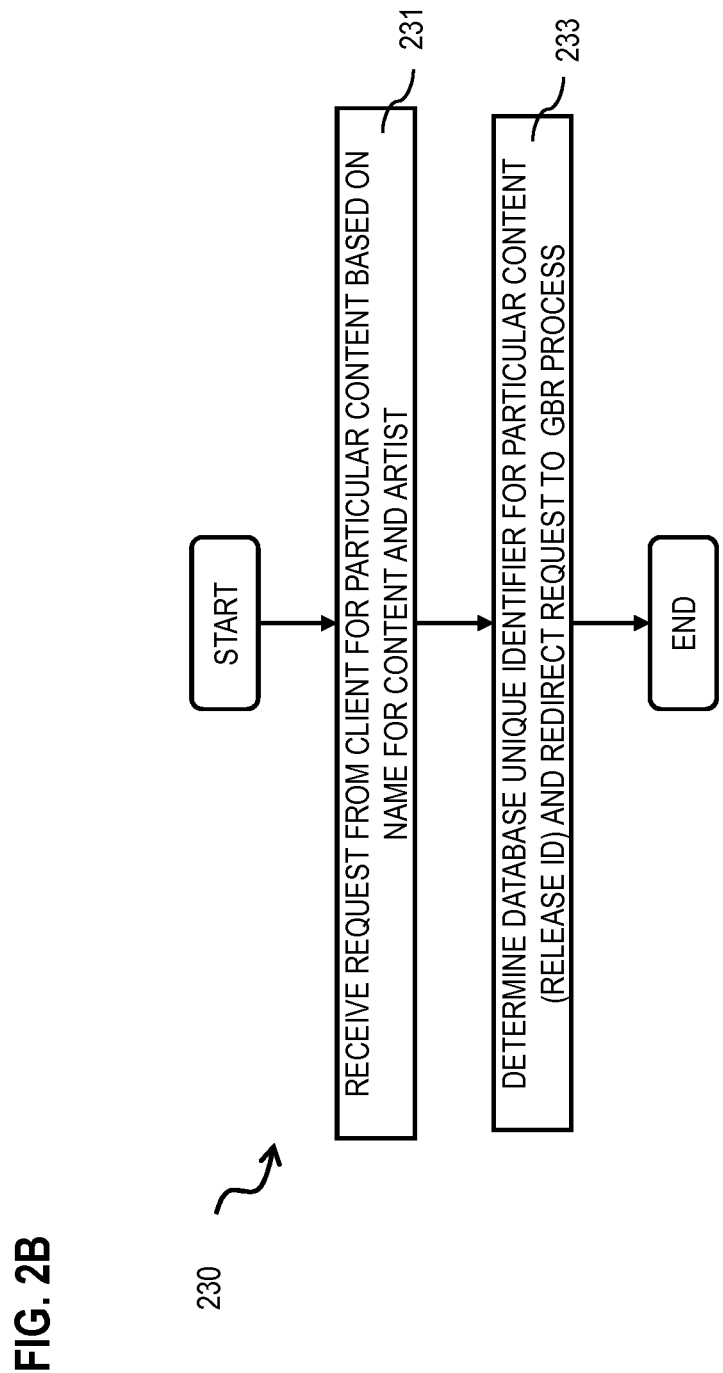
FIG. 2B is a flowchart of a process for a step of the process of FIG. 2A, according to one embodiment.
Figure 2C:
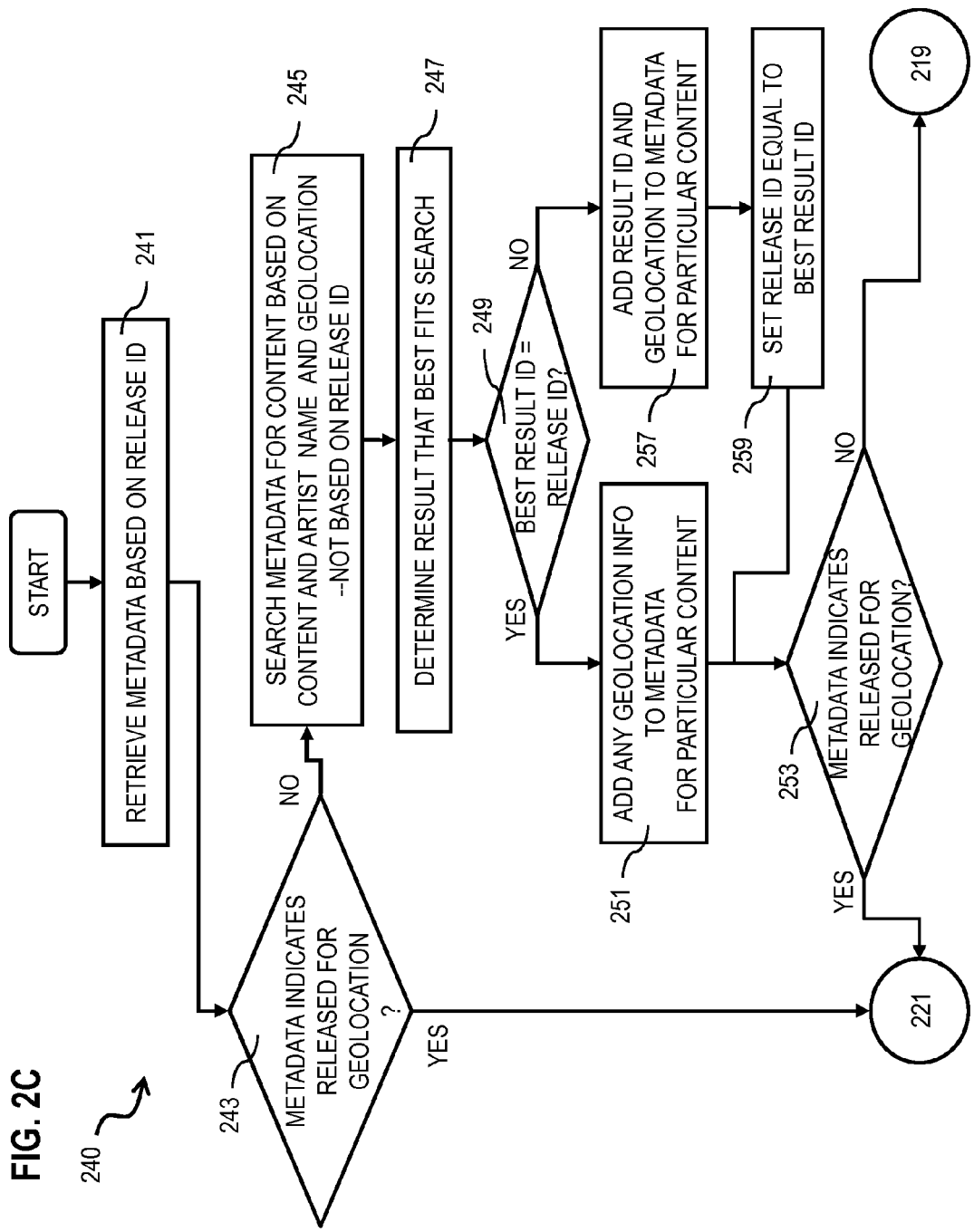
FIG. 2C is a flowchart of a process for another step of the process of FIG. 2A, according to one embodiment.
Figure 4:
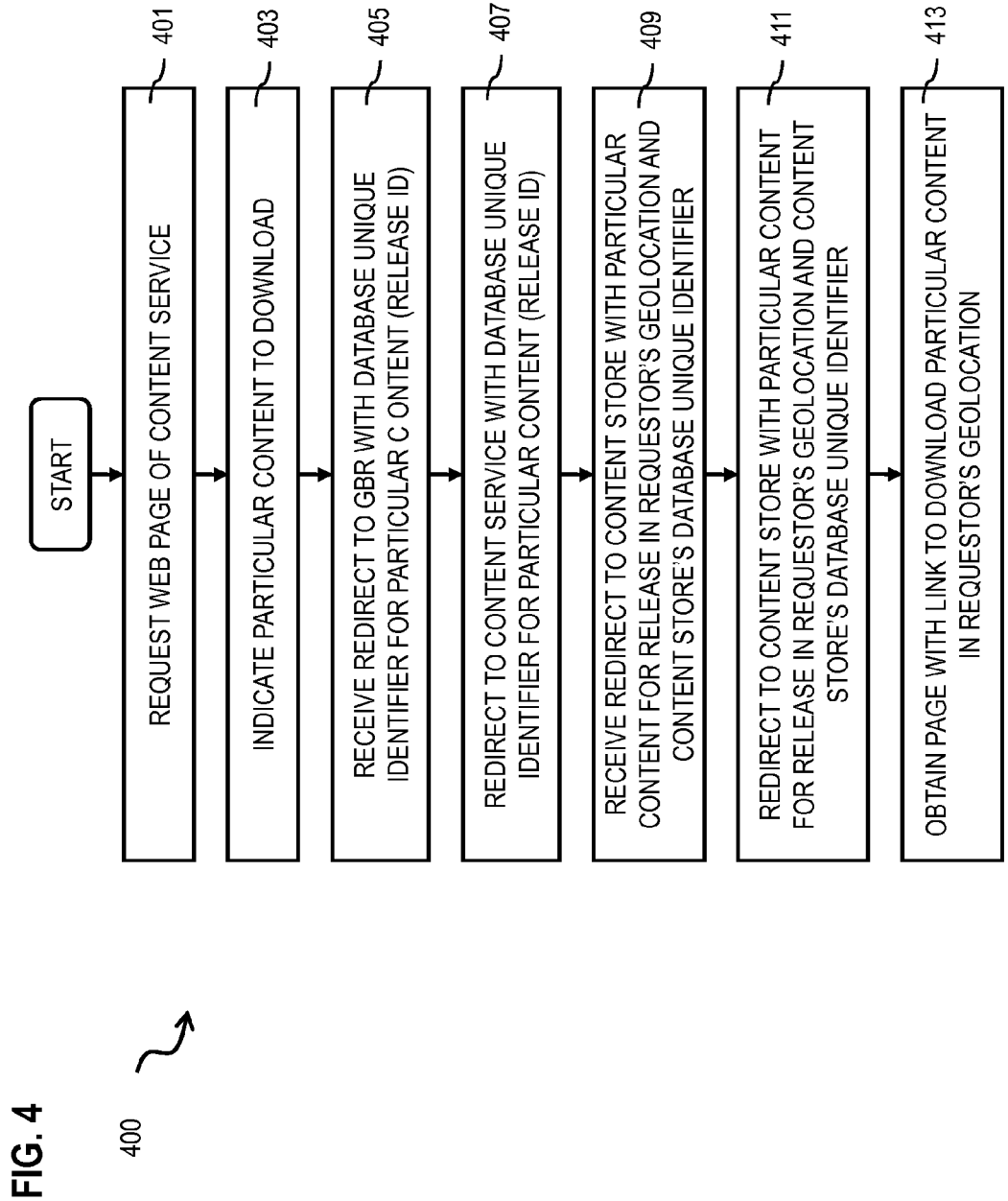
FIG. 4 is a flowchart of a process for a content client, according to one embodiment.

FIG. 2A is a flowchart of a process 200 for accessing content based on user geolocation, according to one embodiment. For example, process 200 is executed by the content service module 133, such as Social Music module 150, including GBR process 137. Although steps in FIG. 2A and subsequent flow charts, FIG. 2B, FIG. 2C and FIG. 4, are shown in a particular order for purposes of illustration, in other embodiments, one or more steps may be performed in a different order or overlapping in time, in series or in parallel, or one or more steps may be omitted or added, or changed in some combination of ways.

In step 211, a request is received from a client, in response to a corresponding user, for particular content. For purposes of illustration, it is assumed that the user is operating a mobile terminal 120 in the United States of America (US) but is accessing a content service module hosted in the United Kingdom (UK), which is the user's home content service module and which is bookmarked on the user's mobile terminal 120. It is further assumed that the content service module 133 includes a GBR process 137.

In step 213, the geographic location (geolocation) of the client process operated by the user is determined, e.g. in the GBR process 137 in the content service module 133. Any method known in the art may be used to determine the location of the client process.

In some embodiments, the user is a registered user whose name and address are known to the content service system and who is associated with a unique identifier on the mobile terminal, or is required to log into the content service module 133. Based on the unique identifier of the mobile terminal, or the user identifier (ID), the user and the user's address are known. However, if the user is on travel, then the actual location of the traveling user cannot be determined this way. If the actual location, rather than the residence location, of the user is used to determine the legal availability of a release, then the residence location is not the desired geolocation when the user is on travel to a different country/region.

In some embodiments, the geolocation of the user, even when the user is on travel, can be deduced from the geolocation of an intermediate network node, e.g., a cell base station that serves as a gateway in network 105 for data transmitted by the user's mobile device 120. Such information is provided by one or more well known services (e.g., GeoIP mapping, CellId, and WLAN positioning, among others) represented by geolocation service 109.

In step 215, the local metadata for the particular content requested is retrieved (e.g., from the local metadata data structure 135). For example, values for at least some of the metadata parameters fields depicted in FIG. 1C are retrieved. The values in field 191 indicate the countries/regions where the release retrieved is allowed (e.g., the content is distributed with permission). The listed countries/regions are called herein the "release locations."

For purposes of illustration, it is assumed that for the particular content identified in the request received per step 211, the local metadata indicates only Europe. It is further assumed that the local metadata is based on a recent query of content store 140a. However, it is further assumed, for purposes of illustration, that content store 140b, for North America, has similar content that is released for the US and Canada. It is further assumed that content store 140a has been recently updated to include South America in its list of release locations.

In step 217 it is determined whether the user's current geolocation is among the release locations. In one embodiment, only the release locations indicated by the local metadata are examined. In this embodiment, for the assumed conditions stated above, it is determined in step 217 that the user's current geolocation is NOT among the release locations. In another embodiment, described in more detail below with reference to FIG. 2C, the release locations indicated by metadata at the metadata stores 140 are also examined. In this embodiment, for the assumed conditions stated above, it is determined in step 217 that the user's current geolocation is among the release locations known at content store 140b.

If it is determined that the user's current geolocation is not among the release locations examined, then, in step 219, a message is sent to the client indicating that the particular content requested has not been released at the user's current location.

However, if it is determined that the user's current geolocation is among the release locations considered, then, in step 221, a Web link to access the requested content is determined based on the metadata that encompassed the user's current geolocation in the metadata release locations. For example, a Web link to access the requested content is provided from the metadata available at content store 140b. In some embodiments the new metadata for the particular content is added to the local metadata.

In some embodiments, step 217 only determines that a content store exists for the user's geolocation and does not determine whether the content is available at that content store. Step 221 determines the network address (e.g., the Uniform Resource Locator, URL) of the content store (e.g., store 140b) that serves the user's geolocation. In step 223 a redirect to the network address of the correct content store (e.g., 140b) is sent to the content client with the metadata or product release ID or both received during step 211 in the original request message. This embodiment, transfers the burden of determining the availability of the particular content to the content store for the user's location.

In step 223, the client is provided with the Web link to access the particular content. In some embodiments, the link is provided by the GBR. In some embodiments, the link is provided by the content store for the user's geolocation; and in some of these embodiments, the link is provided along with the links of one or more other contents that are similar to the requested content. This last embodiment is especially useful when there is not an exact match for the requested product Release ID at the correct content store, but there are contents with similar metadata values, such as the same artist name and album name.

FIG. 2B is a flowchart of a process 230 for a step 211 of the process of FIG. 2A, according to one embodiment. In this embodiment, a legacy content service module does not use release locations field 191 in its local metadata. This legacy content service module is modified in a small increment as content service module 133 to redirect a request for content to a geolocation sensitive process, e.g., GBR process 137. In the illustrated embodiment, the modified content service module is also operative to insert the Release ID into the redirect statement to allow the GBR process to more efficiently identify the requested content. On some embodiments, the redirect includes other metadata for the requested content, e.g., artist name and album name and song title.

In step 231, the modified content service module 133 receives a request from a client for particular content based on a content name and an artist name.

In step 233, the modified content service module 133 searches the local metadata for this combination of content name and artist name and retrieves the associated product Release ID for the requested content. A redirect of the request is performed that includes the Release ID in the redirected request. In some embodiments some or all of the metadata is also included, e.g., the content name and artist name. Any method may be used to perform the redirect and insertion of the Release ID. For example, in one embodiment an HTTP REDIRECT is issued with a Universal Resource Locator (URL) for the GBR process 137 and with Status 302 and with data indicating the Release ID and any included metadata. In one embodiment, the Release ID is not inserted into the redirected request. In step 211, the redirected request is received at the GBR process.

An advantage of this approach is that a legacy content service module that does not use metadata parameter fields 191 or 193 can easily and quickly be modified. All geolocation sensitive processing is isolated in a separate GBR process 137.

FIG. 2C is a flowchart of a process 240 for another step 217 of the process of FIG. 2A, according to one embodiment. In this embodiment, the GBR, for example, determines not only the content store for the user's geolocation; but also determines the actual content at that store that best matches the user's request. In step 241, local metadata for the particular requested content is retrieved based on the Release ID in the redirected request. In other embodiments, the local metadata for the particular requested content is retrieved based on the content name and artist name in the redirected request. In some embodiments, without a redirected request, the local metadata for the particular requested content and the Release ID are retrieved based on the content name and artist name in the original request.

In step 243, it is determined whether the local metadata indicates the requested content is released for the user's geolocation. For example, it is determined whether the release locations indicated in field 191 in the local metadata for the requested content encompass the user's current geolocation. If so, the process continues per step 221 described above.

If not, then a search is made of metadata from one or more content stores in step 245. If a value for the field 191, or the field itself, is absent for the requested content, then it is determined that the local metadata does not indicate the requested content is released for the user's geolocation. In some embodiments, step 245 includes sending a request for metadata to one or more metadata providers 147, such as those at content stores 140, for content identified by the content name and artist name. In some embodiments, the request for metadata also indicates the geolocation associated with the user, and requests only metadata for the requested content that also encompasses that geolocation in field 191. The Release ID is not included in the request because it is not expected that different releases for the related content in different region will use the same primary key. In some embodiments, the results of the search returns metadata for multiple units of content that have values close to those of the requested data. Thus metadata for multiple releases of the same song and artist will be returned in the results.

In step 247, the results returned from the remote metadata providers are searched for the best result. For example, the results are sorted by relevance to the request or relevance to the local metadata for the Release ID, and the most relevant metadata is selected as the best result.

In step 249 it is determined whether the unique database identifier of the best result metadata is the same as the Release ID of the request. If so, then metadata for the release is already in the local metadata. In step 251, any geolocation information in the best result is added to the release locations of the local metadata. For example, if content store 140*a* was updated to include South America among the release locations for the Release ID, then the local metadata for the requested content is updated to include South America with Europe in the list of released locations for the Release ID.

In step 253, it is determined whether the local metadata now indicates the requested content is released for the user's geolocation. If so, then the process continues to get the Web link for access, per step 221 described above. If not, then the process notifies the user that the content is not released for the user's geolocation, per step 219 described above. For example, after adding South America to the metadata parameter for released locations for the requested content, it is determined in step 253 that the content indicated by the Release ID is still not released for the user's geolocation, the US. The process continues per step 219.

If it is determined, in step 249, that the unique database identifier of the best result metadata is not the same as the Release ID of the request, then the best result metadata is a different release that is not yet in the local metadata. In step 257, a new metadata record is stored in the local metadata data structure 135 with all the metadata parameter values available for the best result metadata. In step 259 the Release ID is set to the unique database identifier of the best result metadata. Thereafter the release locations of the new metadata record are compared to the user's geolocation in step 253, described above.

For example, the best results from the content store 140*b* does not match the Release ID but matches the content name and artist name and includes the US among its release locations. Therefore, it is determined to be the best result metadata in step 247 and a new metadata record is added to the local metadata data structures 135 in step 258. In step 251 it is determined that the release locations include the US where the user is currently located. Thus the Web link for content access from the new metadata record is determined, per step 221, and returned to the client requesting the particular content.

Figure 3:
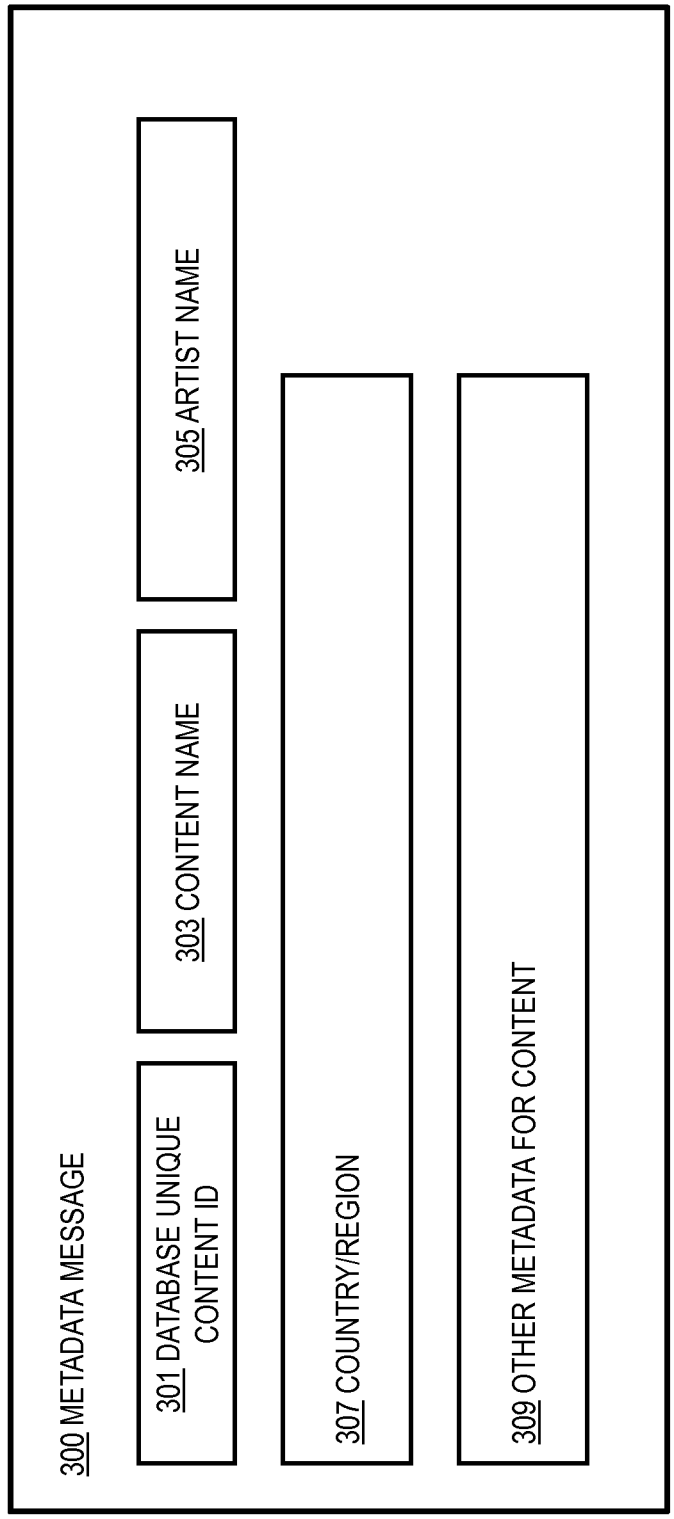
FIG. 3 is a diagram of a metadata message, according to one embodiment.

FIG. 3 is a diagram of a metadata message 300, according to one embodiment. The metadata message is used to forward a metadata request to a metadata provider. In some embodiments, one or more metadata messages are used to receive one or more results from the metadata provider. The metadata message 300 includes: values for the database unique content ID in field 301; values for the content name in field 303; values for the artist name in field 305; values for the country/region in field 307; and values for zero or more other metadata parameters in field 309.

FIG. 4 is a flowchart of a process 400 for a content client, according to one embodiment. In this embodiment, the content client is a Web browser, well known in the art. In step 401, a web page request is sent to the content service module 133. The requested web page offers links to the various content services offered by the content service module, such as forms and links to support browsing for and obtaining content. In step 403, based on user input, particular content to be obtained is indicated, e.g., by content name and artist name.

In step 405, the content client receives a redirect to a GBR. The redirect includes a URL for the GBR and a value for the database unique identifier (Release ID) for the requested content. The redirect causes the content client to send the Release ID to the process identified by the URL in step 407.

The next message received by the content client, if there is no notification that the release is not available in the user's current geolocation, is a redirect to a content store that holds the particular content for release in the user's geolocation, in step 409. The redirect includes the Release ID for the content that is available for release. In step 411 the redirect is sent to the appropriate content store.

In some embodiments, the message received in step 409 is a page with multiple links for the best matches to the metadata of the original request, and user action is invited to select one of the links. In response to user action, the link is followed as the redirect to the content store with the preselected content.

In step 413, the content client receives a page from the content store, which presents links to purchase or download (or both) the requested content available in the user's current geolocation.

As apparent in FIG. 4, the changes to achieve geolocation sensitive access to content are nearly transparent to the content client, except for the redirect to another content service module process in step 405. This redirect is an automatic and currently implemented feature in HTTP and thus requires no modifications to the content client. Also a page of links from which a user can select to be automatically transferred to another network resource is also known and implemented in HTTP.

FIG. 5A is a time sequence diagram that illustrates a sequence of messages and processes for accessing content based on user geolocation, according to one embodiment. Time increases downward in this diagram. A network process on the network is represented by a thin vertical box. A message passed from one process to another is represented by horizontal arrows. A step performed by a process is indicated by a box or looping arrow overlapping the process at a time sequence indicated by the vertical position of the box or looping arrow.

The processes represented in FIG. 5 are the content client 127 on mobile terminal 120, the content service system 130, including the content service module 133 and GBR 137 and the service database 132. Also involved are the geolocation service 109 and a content store 140, including a metadata provider 147 and a content provider 503. A human user 501 operates the content client 127, directly, or indirectly, e.g., through a content player 121.

In response to input from user 501, the content client 127 initiates a request 507 for particular content, e.g., through a Web user interface (UI) or any other user interface (UI) known in the art. In the illustrated embodiment, this request appears to be directed to the legacy content service module, which has been replaced by the modified content service module 133. The modified content service module 133 determines the Release ID and issues a redirect to the GBR process 137. As a result of the redirect, a redirected request 511 with a Release ID is sent to the GBR. The remaining steps performed and messages processed in this column are steps and messages of the GBR process 137. Thus, in various embodiments the request for content comprises either request 507 by itself or request 511 by itself, or both. If both, request 511 is called a second request message.

The GBR process 137 sends a request 513 for finding out the geolocation of the user to the geolocation service 109. The geolocation of the user is returned in message 515. The GBR process 137 then issues a database interface command (e.g., FindRelease(ID)) that sends a retrieval message 517 to the service database 132 for a record from the local metadata. The return message or messages 519 present the metadata for the content indicated by the Release ID. These messages are formatted as metadata message 300 in an embodiment.

In step 561, the GBR process checks whether the release locations for the retrieved metadata includes the user's geolocation. If so, step 563 is skipped and the redirect to the content access link target is built in step 571, based on the Web link in the local metadata. This link target is sent to the content client 127 as a redirect message 529. In response, the content client sends a request message 531 to the access link target of the content provider 503 in the content store 140.

However, if the release locations for the retrieved metadata does not include the user's geolocation, then step 563 of the GBR process is performed. A request for metadata message 521 is sent to a metadata provider 147 in the content store 140. The request 521 is expressed as a database interface command, e.g., "Find(Geolocation, Title, Artist)."

In response, the metadata provider 147 returns resulting metadata in a message 523, e.g., formatted as metadata message 300. The results metadata message 523 includes data from one or more metadata records that include the geolocation or title or artist or some combination. In step 565, the GBR process searches for the best result, e.g., by selecting the most relevant metadata record after sorting by relevance.

If the best result unique database identifier is not the same as the Release ID, then the GBR process performs step 567. The best result is new metadata about a different release, at least. The best result is added to the local metadata in message 525. A pointer from the metadata record with the old Release ID to the new metadata record is added to field 593.

Otherwise, if the best result unique database identifier is the same as the Release ID, then the GBR process performs step 569. The values of the best result are used to update the local metadata in message 527, at least for the release locations parameter in field 191.

The redirect to the content access link target is built in step 571, based on the Web link in the newly updated local metadata. This link target is sent to the content client 127 as a redirect message 529. In response, the content client sends a request message 531 to the access link target of the content provider 503 in the content store 140.

FIG. 5B is a time sequence diagram that illustrates a sequence of messages and processes for accessing content based on user geolocation, according to another embodiment. This embodiment transfers the burden of determining the availability of the particular content to the content store for the user's location.

The content client 127, the content service system 130, including the content service module 133 and GBR 137 and the service database 132, the geolocation service 109 and a content store 140, including a metadata provider 147 and a content provider 503, are as described in FIG. 5A. Also, as described above, in response to input from user 501, the content client 127 initiates a request 507 for particular content, e.g., through a Web user interface (UI) or any other user interface (UI) known in the art. In the illustrated embodiment, this request appears to be directed to the legacy content service module, which has been replaced by the modified content service module 133. The modified content service module 133 determines the Release ID and issues a redirect to the GBR process 137. As a result of the redirect, a redirected request 511 with a Release ID is sent to the GBR. The remaining steps performed and messages processed in this column are steps and messages of the GBR process 137.

As in FIG. 5A, the GBR process 137 sends a request 513 for finding out the geolocation of the user to the geolocation service 109. The geolocation of the user is returned in message 515. The GBR process 137 then issues a database interface command (e.g., FindStore(geolocation)) that sends a retrieval message 581 to the service database 132 for a record from the local metadata. The message 581 includes data that indicates the geolocation returned in the geolocation message 515. The return message or messages 583 includes data that indicates a network address, such as a Uniform Resource Locator (URL), for the music store for that geolocation. These messages are formatted as metadata message 300 in an embodiment.

In process 585 the GBR 137 builds a redirect to the network address for the music store serving the user's location. This redirect includes any information provided in request message 507 and redirect message 511 about the release, such as the product Release ID and such metadata as the artist name, album name and track name for audio content. This redirect is returned to the content client 127 as message 587 and used at content client 127 to send message 589 to the content store 140 servicing the user's location.

The content store 140, e.g., the metadata provider 147 or the content provider 503, determines the contents available at the store, which are similar to the product Release ID or metadata provided in message 589 in search process 591. If there is an exact match to the product Release ID, then a link target to the content provider for that content associated with the Release ID is determined and sent to the content client 127 in message 593, e.g., a redirect message. If not, then one or more link targets are provided for the contents that best match the metadata provided in message 589 or the metadata associated with the product Release ID; and those link targets are included in the message 593 to the content client 127, e.g., as a Web page with one or more links.

Input received from the user at the content client 127 is used to activate one link target, if multiple link targets are provided, to send a request message 531 to access the selected content at content provider 503 in the content store 140. In some embodiments, if only one link is provided in message 593, then that message 593 is a redirect message, like message 529 described above; and, in response, the content client 127 automatically sends a request message 531 to the access link target of the content provider 503 in the content store 140, without further user action.

The processes described herein for content access based on geolocation may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such example hardware for performing the described functions is detailed below.

Figure 6:
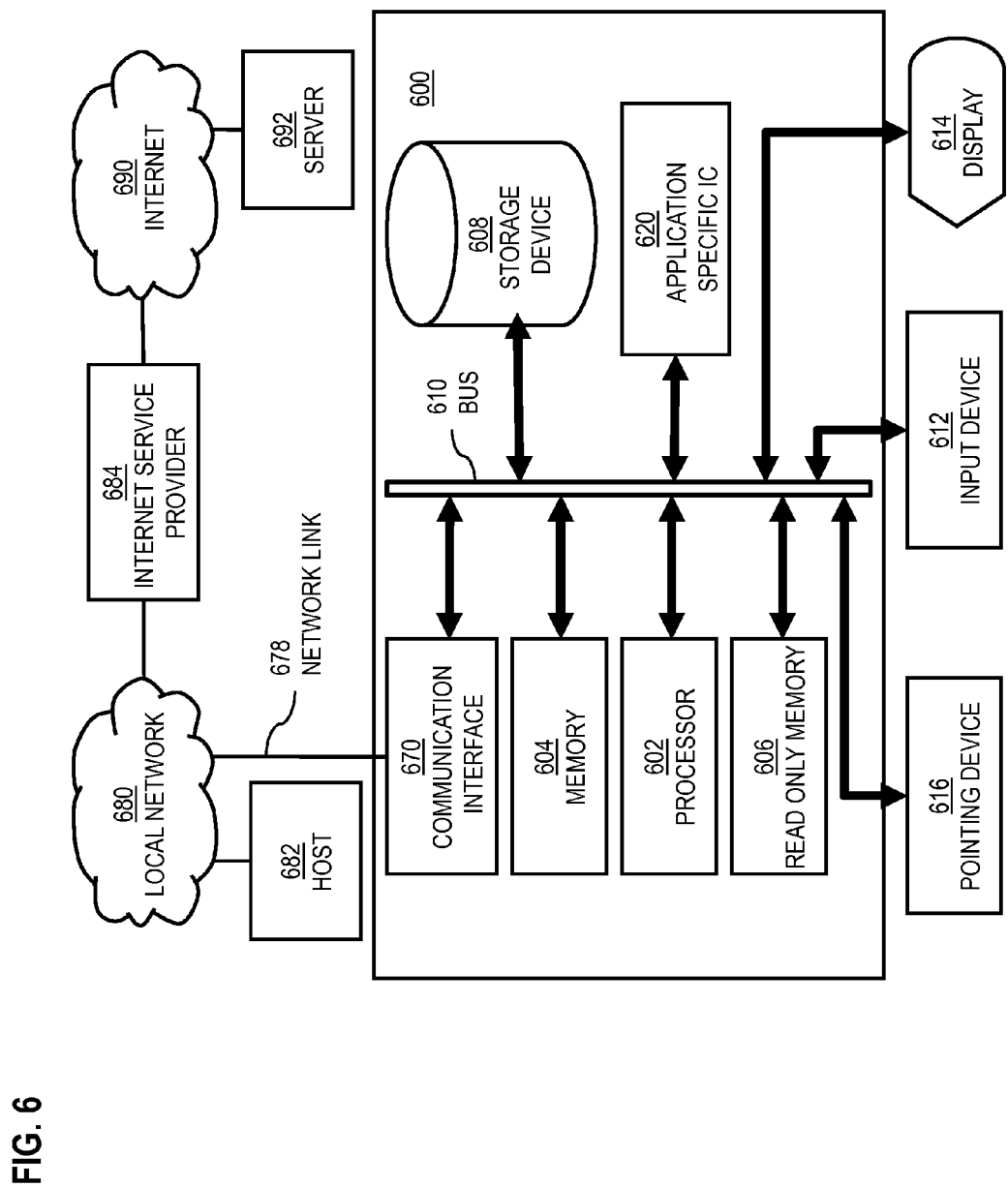
FIG. 6 is a diagram of hardware that can be used to implement an embodiment of the invention.

FIG. 6 illustrates a computer system 600 upon which an embodiment of the invention may be implemented. Computer system 600 includes a communication mechanism such as a bus 610 for passing information between other internal and external components of the computer system 600. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 610 includes one or more parallel conductors of information so that information is transferred quickly among devices coupled to the bus 610. One or more processors 602 for processing information are coupled with the bus 610.

A processor 602 performs a set of operations on information. The set of operations include bringing information in from the bus 610 and placing information on the bus 610. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 602, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 600 also includes a memory 604 coupled to bus 610. The memory 604, such as a random access memory (RAM) or other dynamic storage device, stores information including processor instructions. Dynamic memory allows information stored therein to be changed by the computer system 600. RAM allows a unit of information stored at a location called a memory address to be stored and retrieved independently of information at neighboring addresses. The memory 604 is also used by the processor 602 to store temporary values during execution of processor instructions. The computer system 600 also includes a read only memory (ROM) 606 or other static storage device coupled to the bus 610 for storing static information, including instructions, that is not changed by the computer system 600. Some memory is composed of volatile storage that loses the information stored thereon when power is lost. Also coupled to bus 610 is a non-volatile (persistent) storage device 608, such as a magnetic disk, optical disk or flash card, for storing information, including instructions, that persists even when the computer system 600 is turned off or otherwise loses power.

Information, including instructions, is provided to the bus 610 for use by the processor from an external input device 612, such as a keyboard containing alphanumeric keys operated by a human user, or a sensor. A sensor detects conditions in its vicinity and transforms those detections into physical expression compatible with the measurable phenomenon used to represent information in computer system 600. Other external devices coupled to bus 610, used primarily for interacting with humans, include a display device 614, such as a cathode ray tube (CRT) or a liquid crystal display (LCD), or plasma screen or printer for presenting text or images, and a pointing device 616, such as a mouse or a trackball or cursor direction keys, or motion sensor, for controlling a position of a small cursor image presented on the display 614 and issuing commands associated with graphical elements presented on the display 614. In some embodiments, for example, in embodiments in which the computer system 600 performs all functions automatically without human input, one or more of external input device 612, display device 614 and pointing device 616 is omitted.

In the illustrated embodiment, special purpose hardware, such as an application specific integrated circuit (ASIC) 620, is coupled to bus 610. The special purpose hardware is configured to perform operations not performed by processor 602 quickly enough for special purposes. Examples of application specific ICs include graphics accelerator cards for generating images for display 614, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 600 also includes one or more instances of a communications interface 670 coupled to bus 610. Communication interface 670 provides a one-way or two-way communication coupling to a variety of external devices that operate with their own processors, such as printers, scanners and external disks. In general the coupling is with a network link 678 that is connected to a local network 680 to which a variety of external devices with their own processors are connected. For example, communication interface 670 may be a parallel port or a serial port or a universal serial bus (USB) port on a personal computer. In some embodiments, communications interface 670 is an integrated services digital network (ISDN) card or a digital subscriber line (DSL) card or a telephone modem that provides an information communication connection to a corresponding type of telephone line. In some embodiments, a communication interface 670 is a cable modem that converts signals on bus 610 into signals for a communication connection over a coaxial cable or into optical signals for a communication connection over a fiber optic cable. As another example, communications interface 670 may be a local area network (LAN) card to provide a data communication connection to a compatible LAN, such as Ethernet. Wireless links may also be implemented. For wireless links, the communications interface 670 sends or receives or both sends and receives electrical, acoustic or electromagnetic signals, including infrared and optical signals, that carry information streams, such as digital data. For example, in wireless handheld devices, such as mobile telephones like cell phones, the communications interface 670 includes a radio band electromagnetic transmitter and receiver called a radio transceiver.

The term computer-readable medium is used herein to refer to any medium that participates in providing information to processor 602, including instructions for execution. Such a medium may take many forms, including, but not limited to, non-volatile media, volatile media and transmission media. Non-volatile media include, for example, optical or magnetic disks, such as storage device 608. Volatile media include, for example, dynamic memory 604. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media.

Common forms of computer-readable media include, for example, a floppy disk, a flexible disk, a hard disk, a magnetic tape, or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a transmission medium such as a cable or carrier wave, or any other medium from which a computer can read. Information read by a computer from computer-readable media are variations in physical expression of a measurable phenomenon on the computer readable medium. Computer-readable storage medium is a subset of computer-readable medium which excludes transmission media that carry transient man-made signals.

Logic encoded in one or more tangible media includes one or both of processor instructions on a computer-readable storage media and special purpose hardware, such as ASIC 620.

Network link 678 typically provides information communication using transmission media through one or more networks to other devices that use or process the information. For example, network link 678 may provide a connection through local network 680 to a host computer 682 or to equipment 684 operated by an Internet Service Provider (ISP). ISP equipment 684 in turn provides data communication services through the public, world-wide packet-switching communication network of networks now commonly referred to as the Internet 690. A computer called a server host 692 connected to the Internet hosts a process that provides a service in response to information received over the Internet. For example, server host 692 hosts a process that provides information representing video data for presentation at display 614.

At least some embodiments of the invention are related to the use of computer system 600 for implementing some or all of the techniques described herein. According to one embodiment of the invention, those techniques are performed by computer system 600 in response to processor 602 executing one or more sequences of one or more processor instructions contained in memory 604. Such instructions, also called computer instructions, software and program code, may be read into memory 604 from another computer-readable medium such as storage device 608 or network link 678. Execution of the sequences of instructions contained in memory 604 causes processor 602 to perform one or more of the method steps described herein. In alternative embodiments, hardware, such as ASIC 620, may be used in place of or in combination with software to implement the invention. Thus, embodiments of the invention are not limited to any specific combination of hardware and software, unless otherwise explicitly stated herein.

The signals transmitted over network link 678 and other networks through communications interface 670, carry information to and from computer system 600. Computer system 600 can send and receive information, including program code, through the networks 680, 690 among others, through network link 678 and communications interface 670. In an example using the Internet 690, a server host 692 transmits program code for a particular application, requested by a message sent from computer 600, through Internet 690, ISP equipment 684, local network 680 and communications interface 670. The received code may be executed by processor 602 as it is received, or may be stored in memory 604 or in storage device 608 or other non-volatile storage for later execution, or both. In this manner, computer system 600 may obtain application program code in the form of signals on a carrier wave.

Various forms of computer readable media may be involved in carrying one or more sequence of instructions or data or both to processor 602 for execution. For example, instructions and data may initially be carried on a magnetic disk of a remote computer such as host 682. The remote computer loads the instructions and data into its dynamic memory and sends the instructions and data over a telephone line using a modem. A modem local to the computer system 600 receives the instructions and data on a telephone line and uses an infra-red transmitter to convert the instructions and data to a signal on an infra-red carrier wave serving as the network link 678. An infrared detector serving as communications interface 670 receives the instructions and data carried in the infrared signal and places information representing the instructions and data onto bus 610. Bus 610 carries the information to memory 604 from which processor 602 retrieves and executes the instructions using some of the data sent with the instructions. The instructions and data received in memory 604 may optionally be stored on storage device 608, either before or after execution by the processor 602.

Figure 7:
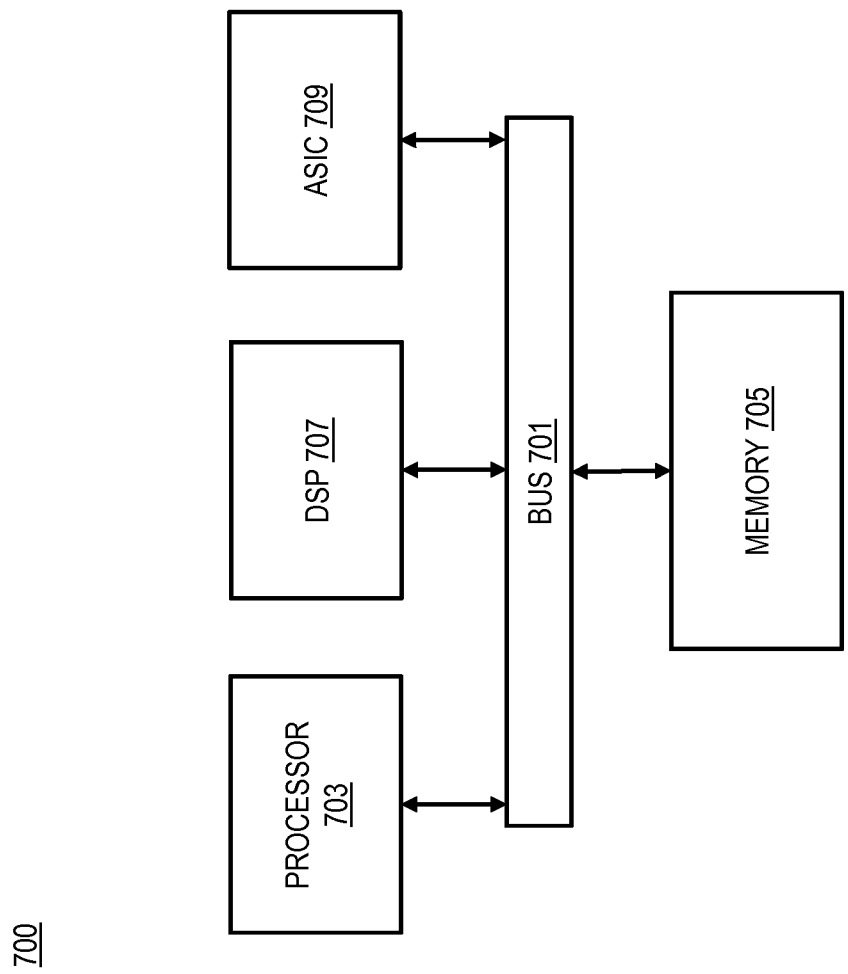
FIG. 7 is a diagram of a chip set that can be used to implement an embodiment of the invention.

FIG. 7 illustrates a chip set 700 upon which an embodiment of the invention may be implemented. Chip set 700 is programmed to carry out the inventive functions described herein and includes, for instance, the processor and memory components described with respect to FIG. 7 incorporated in one or more physical packages. By way of example, a physical package includes an arrangement of one or more materials, components, and/or wires on a structural assembly (e.g., a baseboard) to provide one or more characteristics such as physical strength, conservation of size, and/or limitation of electrical interaction.

In one embodiment, the chip set 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-word signals (e.g., sound) in real time independently of the processor 703. Similarly, an ASIC 709 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein. The memory 705 also stores the data associated with or generated by the execution of the inventive steps.

FIG. 8 is a diagram of example components of a mobile station (e.g., handset) capable of operating in the system of FIG. 1A, according to an example embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the station include a Main Control Unit (MCU) 803, a Digital Signal Processor (DSP) 805, and a receiver/transmitter unit including a microphone gain control unit and a speaker gain control unit. A main display unit 807 provides a display to the user in support of various applications and mobile station functions. An audio function circuitry 809 includes a microphone 811 and microphone amplifier that amplifies the speech signal output from the microphone 811. The amplified speech signal output from the microphone 811 is fed to a coder/decoder (CODEC) 813.

A radio section 815 amplifies power and converts frequency in order to communicate with a base station, which is included in a mobile communication system, via antenna 817. The power amplifier (PA) 819 and the transmitter/modulation circuitry are operationally responsive to the MCU 803, with an output from the PA 819 coupled to the duplexer 821 or circulator or antenna switch, as known in the art. The PA 819 also couples to a battery interface and power control unit 820.

In use, a user of mobile station 801 speaks into the microphone 811 and his or her voice along with any detected background noise is converted into an analog voltage. The analog voltage is then converted into a digital signal through the Analog to Digital Converter (ADC) 823. The control unit 803 routes the digital signal into the DSP 805 for processing therein, such as speech encoding, channel encoding, encrypting, and interleaving. In the example embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 825 for compensation of any frequency-dependent impairments that occur during transmission though the air such as phase and amplitude distortion. After equalizing the bit stream, the modulator 827 combines the signal with a RF signal generated in the RF interface 829. The modulator 827 generates a sine wave by way of frequency or phase modulation. In order to prepare the signal for transmission, an up-converter 831 combines the sine wave output from the modulator 827 with another sine wave generated by a synthesizer 833 to achieve the desired frequency of transmission. The signal is then sent through a PA 819 to increase the signal to an appropriate power level. In practical systems, the PA 819 acts as a variable gain amplifier whose gain is controlled by the DSP 805 from information received from a network base station. The signal is then filtered within the duplexer 821 and optionally sent to an antenna coupler 835 to match impedances to provide maximum power transfer. Finally, the signal is transmitted via antenna 817 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 801 are received via antenna 817 and immediately amplified by a low noise amplifier (LNA) 837. A down-converter 839 lowers the carrier frequency while the demodulator 841 strips away the RF leaving only a digital bit stream. The signal then goes through the equalizer 825 and is processed by the DSP 805. A Digital to Analog Converter (DAC) 843 converts the signal and the resulting output is transmitted to the user through the speaker 845, all under control of a Main Control Unit (MCU) 803—which can be implemented as a Central Processing Unit (CPU) (not shown).

The MCU 803 receives various signals including input signals from the keyboard 847. The MCU 803 delivers a display command and a switch command to the display 807 and to the speech output switching controller, respectively. Further, the MCU 803 exchanges information with the DSP 805 and can access an optionally incorporated SIM card 849 and a memory 851. In addition, the MCU 803 executes various control functions required of the station. The DSP 805 may, depending upon the implementation, perform any of a variety of conventional digital processing functions on the voice signals. Additionally, DSP 805 determines the background noise level of the local environment from the signals detected by microphone 811 and sets the gain of microphone 811 to a level selected to compensate for the natural tendency of the user of the mobile station 801.

The CODEC 813 includes the ADC 823 and DAC 843. The memory 851 stores various data including call incoming tone data and is capable of storing other data including music data received via, e.g., the global Internet. The software module could reside in RAM memory, flash memory, registers, or any other form of writable storage medium known in the art. The memory device 851 may be, but not limited to, a single memory, CD, DVD, ROM, RAM, EEPROM, optical storage, or any other non-volatile storage medium capable of storing digital data.

An optionally incorporated SIM card 849 carries, for instance, important information, such as the cellular phone number, the carrier supplying service, subscription details, and security information. The SIM card 849 serves primarily to identify the mobile station 801 on a radio network. The card 849 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   receiving a request, corresponding to a user, for particular content;
   determining a geographic location of the user; and
   initiating selective redirection for retrieval of the particular content based on the determined geographic location,
   wherein receiving the request for particular content further comprises:
      receiving an initial request that indicates one or more names for the particular content;
      determining a local identifier for the particular content based on the one or more names for the particular content, wherein the local identifier is a unique identifier for the particular content in a local metadata database; and
   in response to determining the local identifier, initiating sending a link that indicates both a local content service process and the local identifier to an application for activation by the user.

2. A method of claim 1, wherein receiving the request for particular content further comprises receiving a second request that indicates both the local content service process and the local identifier.

3. A method of claim 2, further comprising:
   in response to receiving the second request, initiating retrieving local metadata based on the local identifier for the particular content; and
   determining, based on the local metadata, a link to access the particular content for the selective redirection, if the local metadata indicates that the particular content is available in the geographic location.

4. A method of claim 1, wherein initiating selective redirection further comprises:
   determining a network address for a content store for the location; and
   initiating sending a redirect link that includes data that indicates the network address of the content store and metadata describing the particular content.

5. A method of claim 1, further comprising:
   initiating sending a message that indicates the particular content is not available, if the particular content may not be released in the geographic location.

6. A method comprising:
   receiving a request, corresponding to a user, for particular content;
   determining a geographic location of the user;
   initiating selective redirection for retrieval of the particular content based on the determined geographic location;
   initiating retrieving local metadata for the particular content;
   initiating retrieving remote metadata based on one or more names for the particular content, if the local metadata does not indicate that the particular content is available in the geographic location; and
   determining, based on the remote metadata, a link to access the particular content for the selective redirection, if the remote metadata indicates that the particular content is available in the geographic location.

7. A method of claim 6, wherein determining, based on the remote metadata, a link to access the particular content for the selective redirection further comprises searching a plurality of links to access the particular content in the remote metadata to determine a most relevant link in the remote metadata to access the particular content.

8. A method of claim 6, wherein determining, based on the remote metadata, a link to access the particular content for the selective redirection further comprises determining, based on the remote metadata, that a link in the local metadata to access the particular content may be used for the geographic location.

9. An apparatus comprising:
   at least one processor; and
   at least one memory including computer program code,
   the at least one memory and the computer program code configured to, with the at least one processor, cause the apparatus to perform at least the following:
      receive a request, corresponding to a user, for particular content;
      determine a geographic location of the user; and
      initiate selective redirection for retrieval of the particular content based on the determined geographic location
   wherein receive an initial request that indicates one or more names for the particular content further comprises:
   determine a local identifier for the particular content based on the one or more names for the particular content, wherein the local identifier is a unique identifier for the particular content in a local metadata database; and
   in response to determining the local identifier, initiate sending a link that indicates both a local content service process and the local identifier to an application for activation by the user.

10. An apparatus of claim 9, wherein receiving the request for particular content further comprises receiving a second request that indicates both the local content service process and the local identifier.

11. An apparatus of claim 10, wherein the processor and the memory are further configured to perform:
   in response to receiving the second request, initiating retrieving local metadata based on the local identifier for the particular content; and
   determining, based on the local metadata, a link to access the particular content for the selective redirection, if the local metadata indicates that the particular content is available in the geographic location.

12. An apparatus of claim 9, wherein the processor and the memory are further configured to perform initiating sending a message that indicates the particular content is not available, if the particular content may not be released in the geographic location.

13. An apparatus of claim 9, wherein the apparatus is included in a handset configured to receive a request for particular content over a communication network that includes a wireless network.

14. An apparatus comprising:
at least one processor; and
at least one memory including computer program code, the at least one memory and the computer program code configured to, with the at least one processor, cause the apparatus to perform at least the following:
receive a request, corresponding to a user, for particular content;
determine a geographic location of the user;
initiate selective redirection for retrieval of the particular content based on the determined geographic location;
initiate retrieving local metadata for the particular content;
initiate retrieving remote metadata based on one or more names for the particular content, if the local metadata does not indicate that the particular content is available in the geographic location;
determine a local identifier for the particular content based on the one or more names for the particular content, wherein the local identifier is a unique identifier for the particular content in a local metadata database; and
in response to determining the local identifier, determine, based on the remote metadata, a link to access the particular content for the selective redirection, if the remote metadata indicates that the particular content is available in the geographic location.

15. An apparatus of claim 14, wherein determining, based on the remote metadata, a link to access the particular content for the selective redirection further comprises searching a plurality of links to access the particular content in the remote metadata to determine a most relevant link in the remote metadata to access the particular content.

16. An apparatus of claim 14, wherein determining, based on the remote metadata, a link to access the particular content for the selective redirection further comprises determining, based on the remote metadata, that a link in the local metadata to access the particular content may be used for the geographic location.

17. A computer-readable storage medium carrying one or more sequences of one or more instructions which, when executed by one or more processors, cause an apparatus to at least perform the following steps:
receiving a request, corresponding to a user, for particular content;
determining a geographic location of the user; and
initiating selective redirection for retrieval of the particular content based on the determined geographic location
wherein receiving the request for particular content further comprises:
receiving an initial request that indicates one or more names for the particular content;
determining a local identifier for the particular content based on the one or more names for the particular content, wherein the local identifier is a unique identifier for the particular content in a local metadata database; and
in response to determining the local identifier, initiating sending a link that indicates both a local content service process and the local identifier to an application for activation by the user.

\* \* \* \* \*